United States Patent [19]

Parke et al.

[11] 4,169,242
[45] Sep. 25, 1979

[54] RESISTOR GRID PROTECTOR

[75] Inventors: Harry G. Parke, Brooklyn; Harry W. Tomsky, Bronx, both of N.Y.

[73] Assignee: Marine Electric Corporation, Brooklyn, N.Y.

[21] Appl. No.: 849,796

[22] Filed: Nov. 9, 1977

[51] Int. Cl.² .............................................. H02P 1/04
[52] U.S. Cl. ................................... 318/473; 318/139; 318/484; 318/516
[58] Field of Search ............... 318/277, 139, 471, 472, 318/473, 514–516, 484, 485; 307/141, 141.4

[56] References Cited

U.S. PATENT DOCUMENTS 1,431,948  10/1922  Hallock ................................ 318/277
4,044,288  8/1977  Godfrey .............................. 318/485

*Primary Examiner*—Gene Z. Rubinson
*Assistant Examiner*—M. K. Mutter
*Attorney, Agent, or Firm*—Wender, Murase & White

[57] ABSTRACT

Apparatus for preventing damage to resistor grids in the propulsion controller circuit of a direct current motor, particularly of the type used in driving railway vehicles, in which a line breaker relay is de-energized whenever the propulsion controller fails to progress from the switch position to the full series position within 15-25 seconds. The line breaker relay remains de-energized for the duration of the power cycle of the propulsion controller and becomes operational automatically after the master control handle is returned to the off position.

2 Claims, 1 Drawing Figure

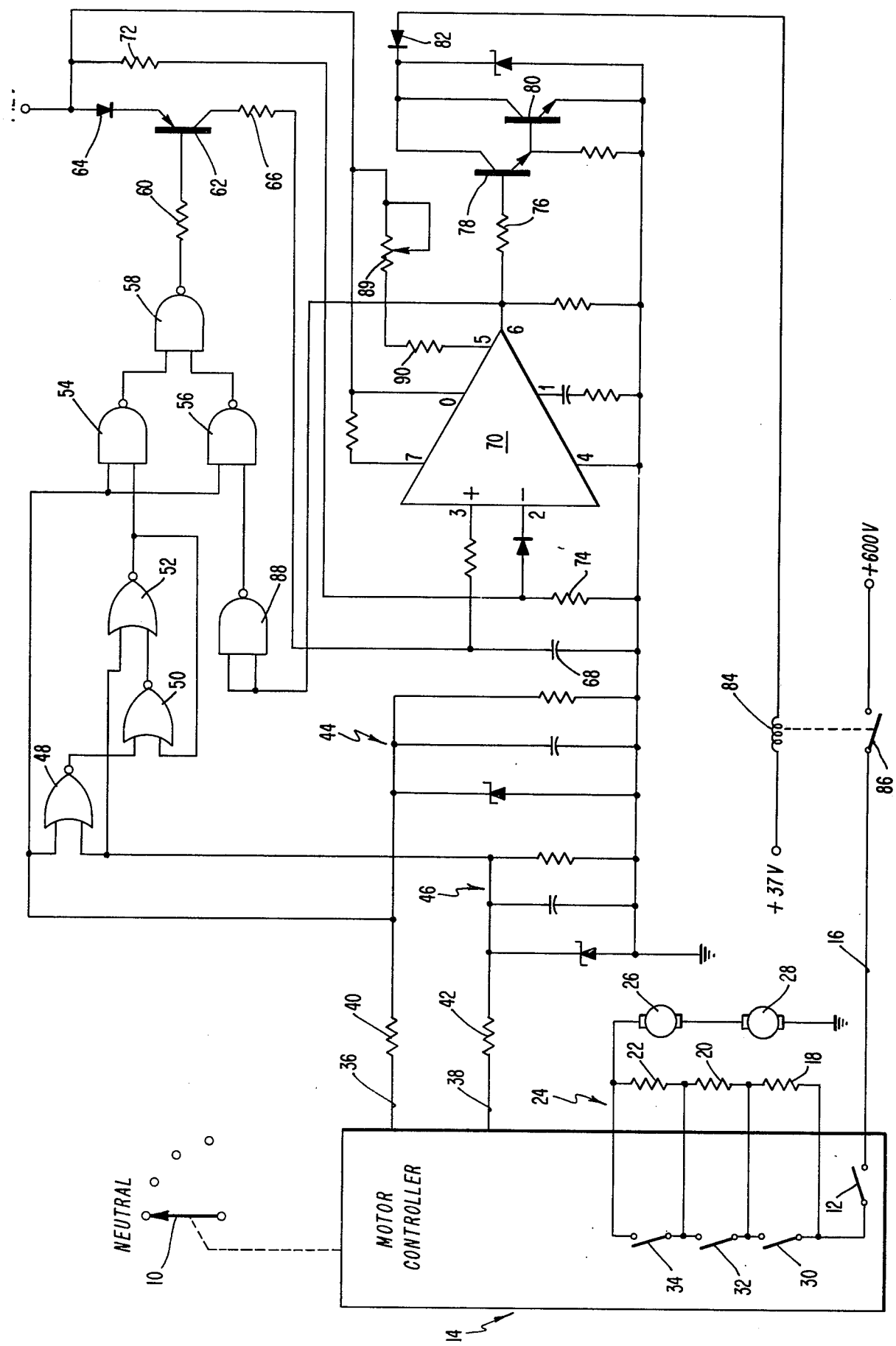

RESISTOR GRID PROTECTOR

BACKGROUND OF THE INVENTION

Field of the Invention

The present invention relates to fault detection circuits for direct current motors, and more particularly, to such circuits in which damage to resistor grids is prevented in response to the failure of the motor propulsion controller to progress from the switch position to the full series position within a predetermined time interval.

SUMMARY OF THE INVENTION

It is an object of the present invention to prevent excessive duty cycle of resistor grids associated with direct current motors prior to the time the motor controller moves to the full series position.

BRIEF DESCRIPTION OF THE DRAWING

The FIGURE is a schematic diagram of a preferred embodiment of a resistor grid protector in accordance with the present invention.

DESCRIPTION OF THE PREFERRED EMBODIMENT

Referring to the FIGURE, switch 10 represents the conventional motorman's control typically found on a transit vehicle. When switch 10 is in the neutral position, as shown, contacts 12 contained within the motor controller network 14 are closed. When switch 12 is closed, operating potential from the 600 volt supply will be fed from bus 16 through resistors 18, 20 and 22 of a resistor grid network 24 to traction motors 26 and 28. If the switch 10 is sufficiently advanced, and the vehicle begins to pick up speed, motor controller 14 will cause additional switches 30, 32 and 34 to become closed thereby successively removing the resistors in grid 24 from the circuit. When all of the resistors have been removed from the circuit, the network assumes what shall be referred to as the full series position. If the resistors are not removed from the series circuit within a predetermined time, generally between 15 and 25 seconds, they will overheat and be destroyed. Further movement of the motor control and increased speed of the train in most designs will place the motors in parallel and may also introduce field weakening. These features are not shown in the drawing and play no part in the present invention but are mentioned merely for the sake of completeness.

In the motor controller 14, in addition to the power controls, there are also provided pilot contacts which indicate the position of the motor controller. The present invention utilizes two of such positions, one of which indicates that the motor control switch has been moved off the neutral position and the other of which indicates that the full series position of the power control switches has been reached. The pilot position indicating an off neutral position provides an output on line 36 and the other pilot position provides an output on line 38.

The output signals on lines 36 and 38, respectively, are fed through resistors 40 and 42 and are limited by Zener diode networks 44 and 46 to a maximum of 12 volts DC which constitutes a logical 1.

When the motorman has his control in the neutral position there is no signal present on either of lines 36 or 38. As a result, both inputs to NOR gate 48 will be at ground or logical 0 and the output will be at the full 12 volt supply or logical 1. This logical 1 is coupled to one of the inputs of NOR gate 50 and will insure that the output of gate 50 will be at logical 0. The input of NOR gate 52 consists of the output of gate 50 and the voltage across Zener network 46. Since both of these are at logical 0, the output of gate 52 will be at logical 1. Since this output is connected to the other input of NOR gate 50, both inputs of gate 50 will be at logical 1. It will be realized by those skilled in the art that gates 50 and 52 constitute a flip-flop—a circuit that will maintain a state until disturbed.

NAND gates 54 and 56 each have one input coming from the voltage across Zener network 44. Since in the assumed neutral position this voltage is 0, there is a logical 0 at the inputs of both NAND gates and the output of each one will be at logical 1. This constitutes the input of NAND gate 58 which will therefore be at logical 0, i.e., ground potential. The output of gate 58 is applied through resistor 60 to the base of PNP transistor 62 turning it on and permitting capacitor 68 to charge through transistor 62, diode 64 and resistor 66 to the full supply potential of plus 12 volts. This voltage across the capacitor is applied to the positive input of sensing circuit 70, the negative input of which is fed from a tap across the 12 volt supply as determined by resistors 72 and 74. Since the voltage applied to the positive input is higher than the voltage applied to the negative input, the output of circuit 70 will be high, i.e., at 12 volts or a logical 1. The output from circuit 70 is applied through resistor 76 to Darlington connected transistors 78 and 80 turning them on. The collector current of these transistors passes through diode 82 and energizes solenoid contactor 84 which holds its contacts 86 closed making 600 volts available to power the traction motors. The logical 1 at the output of circuit 70 is also inverted by inverter 88 and applied to one of the inputs of NAND gate 56 as a logical 0. In the present position, this does not change the operation of the gates as previously described.

As soon as the motor control is moved off neutral, i.e., the train is started, an output signal will appear on line 36 which will result in a logical 1 being present across Zener diode network 44. This will cause the output of gate 48 to go to a logical 0 but this will not upset the flip-flop composed of gates 50 and 52. Now, both inputs to gate 54 will be at a logical 1; therefore, the output of gate 54 will be at a logical 0 and the output of gate 58, therefore, at a logical 1. This will cut off transistor 62 and prevent capacitor 68 from further charging from the 12 volt supply. The charge on capacitor 68 will therefore leak off through the input to sensing circuit 70. With the preferred type of sensing circuit (an operational transconductance amplifier such as preferably the RCA 3094), this leakage rate is a precisely controllable and constant value. It can be set by proper selection and adjustment of resistors 89 and 90 which control the amplifier bias current. The circuit is preferably set so that about 20 seconds time is required before the voltage across capacitor 68 will decrease to the level of the voltage across the resistor 74.

If the controls are properly operated and the cars are not overloaded, the motor controller will have attained the full series position within the preset time period. This is the normal and desirable operation and will result in there being no danger of the resistors 18–22 overheating. If this occurs, a voltage will appear on line 38 before the voltage across capacitor 68 decreases to the same value as the voltage across resistor 74. When this occurs, a logical 1 will appear across Zener diode network 46 and will be applied to the input of NOR gate 52. The output of gate 52 will then be driven low and, as will be understood by those skilled in the art, the flip-flop consisting of gates 50 and 52 will transfer to its other stable state with the output of gate 52 low. Since the output of gate 52 constitutes one of the inputs of gate 54, the output of gate 54 will go high. Since the output of gate 56 is already high, when the output of gate 54 goes high, the output of gate 58 will go low turning on transistor 62 and quickly charging capacitor 68 to the full 12 volt supply. Because the flip-flop 50 and 52 will hold its state, even if the voltage across Zener network 46 disappears, the transistor 62 will be locked on (through the operation of the flip-flop) even after the motor controller goes up beyond full series to the parallel or field weakening position. The output of circuit 70 will continue to be high and solenoid 84 will maintain its contacts 86 in the closed position keeping the power flowing on uninterruptedly to motors 26 and 28.

If because of maloperation or overloading of the car, the motor controller does not attain the full series position before the preset time as determined by the discharge rate of capacitor 68, the following will occur. The output of circuit 70 will go low turning off transistors 78 and 80, de-energizing coil 84 and causing contacts 86 to open thereby removing power from the drive motors and, of course, preventing further overheating of resistors 18, 20 and 22. The logical 0 now present at the output of circuit 70 will be inverted by inverter 88 into a logical 1 and will be presented to the lower input of gate 56. Since the other input of gate 56 also has a logical 1 on it from Zener network 44, the output of gate 56 will be low causing the input of gate 58 to be low and hence the output of gate 58 to be high cutting off transistor 62. It will be apparent that this operation will be stable and that circuit 70 will be locked off preventing coil 84 from being re-energized until the control is returned to the neutral position.

From the foregoing, it can be appreciated that the circuit according to the present invention automatically prevents overheating damage to resistor grids in the propulsion controller circuit of direct current motors by de-energizing the line breaker relay whenever the propulsion controller fails to progress from the switch position to the full series position within approximately 15–25 seconds. The circuit further maintains the line breaker off for the duration of the power cycle and becomes operational automatically after the master control handle is returned to the off position.

Inasmuch as the present invention is subject to many modifications, variations and changes in detail, it is intended that the foregoing description be interpreted as illustrative and not in a limiting sense.

What is claimed is:

1. A device for preventing damage to resistor grids in a propulsion controller circuit for a direct current motor of the type used in driving railway vehicles, the propulsion controller circuit providing a first electrical control signal when power is applied to the motor and a second electrical control signal when full series operation of the motor has been attained, said devices comprising:

control means adapted to be connected to receive said first and second control signals for assuming a first state to provide a first electrical output in response to the first control signal and for assuming a second state to provide a second electrical output in response to the second control signal, said control means including a flip-flop having a pair of inputs coupled to receive said first and second control signals;

a line breaker relay for removing operating potential from the direct current motor;

a timing network connected to said control means and said line breaker relay, said timing network being responsive to said first electrical output of said control means to cause said line breaker relay to remove operating potential from the direct current motor a predetermined time period after receipt of said first electrical output of said control means, said timing circuit being responsive to receipt of said second electrical output of said control means prior to the expiration of said predetermined time period for assuming and maintaining a reset condition without removing operating potential from the motor;

said timing network including a capacitor having charging and discharging networks, a semiconductor switching element connected in said charging network of said capacitor to control the charging of said capacitor, and a comparator circuit connected in said discharging network of said capacitor, said semiconductor switching element having a control electrode connected to an output of said control means, and said comparator circuit including an operational transconductance amplifier having a first input connected to receive a preset biasing voltage and a second input connected to said capacitor, and having an output coupled to the coil of said line breaker relay, said amplifier causing energization of said coil whenever the voltage on said capacitor is greater than said biasing voltage and causing deenergization of said coil to drop-out said contacts whenever the voltage on said capacitor discharges below said biasing voltage; and said control means further including lock means having a first input connected to an output of said timing network and a second input connected to an output of said flip-flop for locking said control means in said first state whenever full series operation is not attained within said predetermined time period and for locking said control means in said second state whenever full series operation is attained within said predetermined time period.

2. A device as recited in claim 1 wherein said lock means includes first, second and third identical logic gates, each of said first and second logic gates having an output coupled to a respective input of said third logic gate, and each of said first and second logic gates having an input respectively coupled to said output of said timing network and to said output of said flip-flop.

* * * * *